(12) United States Patent
Novick

(10) Patent No.: US 6,224,037 B1
(45) Date of Patent: May 1, 2001

(54) COLUMN FOR LIFTING LOADS

(75) Inventor: Philippe Novick, Envermeu (FR)

(73) Assignee: Serapid France, Saint-Nicolas-d'Aliermont (FR)

( * ) Notice: Subject to any disclaimer, the term of this patent is extended or adjusted under 35 U.S.C. 154(b) by 0 days.

(21) Appl. No.: 09/450,324

(22) Filed: Nov. 29, 1999

(30) Foreign Application Priority Data

Nov. 30, 1998 (FR) .................................................. 98 15031

(51) Int. Cl.⁷ .................................................. F16H 29/02
(52) U.S. Cl. .................................................. 254/95
(58) Field of Search .................................... 254/95, 97, 4 R, 254/47, DIG. 6; 74/89.21, 250, 251, 501 R, 501.5 R, 502; 414/18, 14–16, 214; 198/799, 678; 474/155, 212–217, 239–234, 206

(56) References Cited

U.S. PATENT DOCUMENTS

| 2,574,657 | 11/1951 | Pierce . |
| 3,719,291 | * 3/1973 | Redan .............................. 254/DIG. 6 |
| 3,831,455 | * 8/1974 | Patrignani ........................ 254/DIG. 6 |
| 4,406,096 | 9/1983 | Matsutani . |
| 4,830,337 | * 5/1989 | Ichiro et al. ............................ 254/95 |
| 5,156,574 | 10/1992 | Gai . |

FOREIGN PATENT DOCUMENTS 2 659 714   3/1991   (FR) .

* cited by examiner

*Primary Examiner*—Robert C. Watson
(74) *Attorney, Agent, or Firm*—Randall J. Knuth

(57) ABSTRACT

A lifting device enabling loads to be lifted over long distances, characterized in that it comprises a housing fitted with two rotary pinions driving an articulated lifting column and comprising two parallel articulated sides joined by means of connecting shafts, each side comprising two contiguous rows of essentially rectangular plates place end to end to end in a same row and longitudinally offset one row from another the plates of one row being applied against the plates of the contiguous row and having a front active face and a rear active face which move to bear respectively against the rear and front active faces of the adjacent plates when the section of lifting column comprising the plates is vertically extended.

8 Claims, 2 Drawing Sheets

COLUMN FOR LIFTING LOADS

The present invention relates to a column for lifting loads designed to transmit vertical thrust forces and enabling loads to be lifted over large distances.

A column of this type is particularly well suited to erecting platforms although this application is not restrictive.

More specifically, the present invention relates to a device enabling loads to be lifted over large distances, which is simple to manufacture and implement and which furthermore consists of only a limited number of components.

To this end, the present invention relates to a lifting device designed to transmit vertical thrust forces, characterised in that it comprises a housing fitted with two rotary pinions driving an articulated lifting column having a horizontal arm and a vertical arm separated by an elbow part, the lifting column comprising two parallel articulated sides joined by means of transversely oriented connecting shafts co-operating with the driving pinions.

For the purposes of the invention, each side comprises two contiguous rows of essentially rectangular plates placed end to end in a same row and longitudinally offset one row from another.

Each plate has, on the one hand, two main faces provided with holes for receiving the connecting shafts, by means of one of which the plates of one row are applied against the plates of the contiguous row, and on the other hand, four edge faces, namely two longitudinal edge faces, one internal and the other external relative to the elbow part of the lifting column, and two side edge faces defining a front active face and a rear active face which bear respectively against the rear and front active faces of the adjacent plates of a same row when the section of the lifting column comprising these plates is vertically extended.

The function of the lifting column based on this design is to transmit vertical thrust forces whilst the housing transmits the power and retains the plates, subjected to vertical compression forces.

The operating principle of the device proposed by the invention is therefore based on converting a rotary movement into a movement in translation; this device can therefore be likened to an articulated bar.

A system based on this principle takes up less space for a longer distance of travel than jack-operated lifting systems known from the prior at.

The device proposed by the invention is also distinctive because of its reliability and safety in the event of incidents.

By preference, the plates proposed by the invention are all identical and are offset at a pitch equal to half their length from one row to the contiguous row.

This is a particularly advantageous feature of the invention since it means that only one cutting tool is needed for all the plates, regardless of their position on the lifting column; this simplification represents a significant reduction in the cost price of the lifting column.

Clearly, the dimensions of the plates and the pitch of the lifting column must be optimised for each situation and for a given length in order to reduce the cost price for a given length; in practice, the greater the pitch, the fewer the number of parts needed but the greater the space requirement of the housing.

It should be pointed out that as a general rule, this pitch is in the order of 100 mm.

Another advantage of the device proposed by the invention resides in the fact that the lifting column has a "closed" section, defined on the one hand by its two articulated sides (due to the presence of the two contiguous rows of plates) and on the other by the connecting shafts which are "trapped" between the two articulated sides of the lifting column; this guarantees better stability of the unit.

By virtue of one preferred feature of the invention, each plate has three holes for receiving three connecting shafts arranged respectively in the layout of an isosceles triangle.

These holes are subdivided into a driving hole contiguous with the external longitudinal edge face centred on the transverse axis of the plate and two articulation holes arranged symmetrically on either side of this axis and contiguous with the internal longitudinal edge face.

The articulation holes of the plates of the two contiguous rows of a same side of the lifting column are arranged in pairs one above the other.

The connecting shafts of the two sides of the lifting column are in turn subdivided on the one hand into articulation shafts which are inserted through the articulation holes arranged in pairs one above the other in the plates of the two respective contiguous rows and, on the other hand, driving shafts which are inserted alternately through the driving holes of the plates of one or other of the two contiguous rows.

The number of connecting shafts and their triangular layout improves distribution of the thrust force.

As a result of another feature of the invention, the side edge faces of the plates are provided with essentially semi-circular notches which form a releasable enclosure enabling the driving shafts to be inserted therein when these faces move to bear one against the other.

The presence of these notches is indispensable in enabling the active faces of the plates to be applied one against the other in line with the driving shafts.

By virtue of another feature of the invention, the internal longitudinal edge faces of the plates are bevelled at their ends.

This configuration permits articulation of the lifting column on a level with its elbow part.

As a result of another feature proposed by the invention, the driving pinions are fixed to the bottom part of the vertical arm of the lifting column, on the external face thereof, and co-operate with the driving shafts of the plates.

This particular positioning of the driving pinions is another essential feature of the device proposed by the invention since it produces a better "locking" effect, thereby enhancing the stability of the lifting column.

It should be pointed out that the rollers mounted on the external face of the column (pinion side) act as a drive for the latter whilst the rollers mounted on the internal face act as a guide thereof.

The features of the device for lifting loads proposed by the invention will be described in more detail with reference to the appended drawings, of which:

Figure 1:
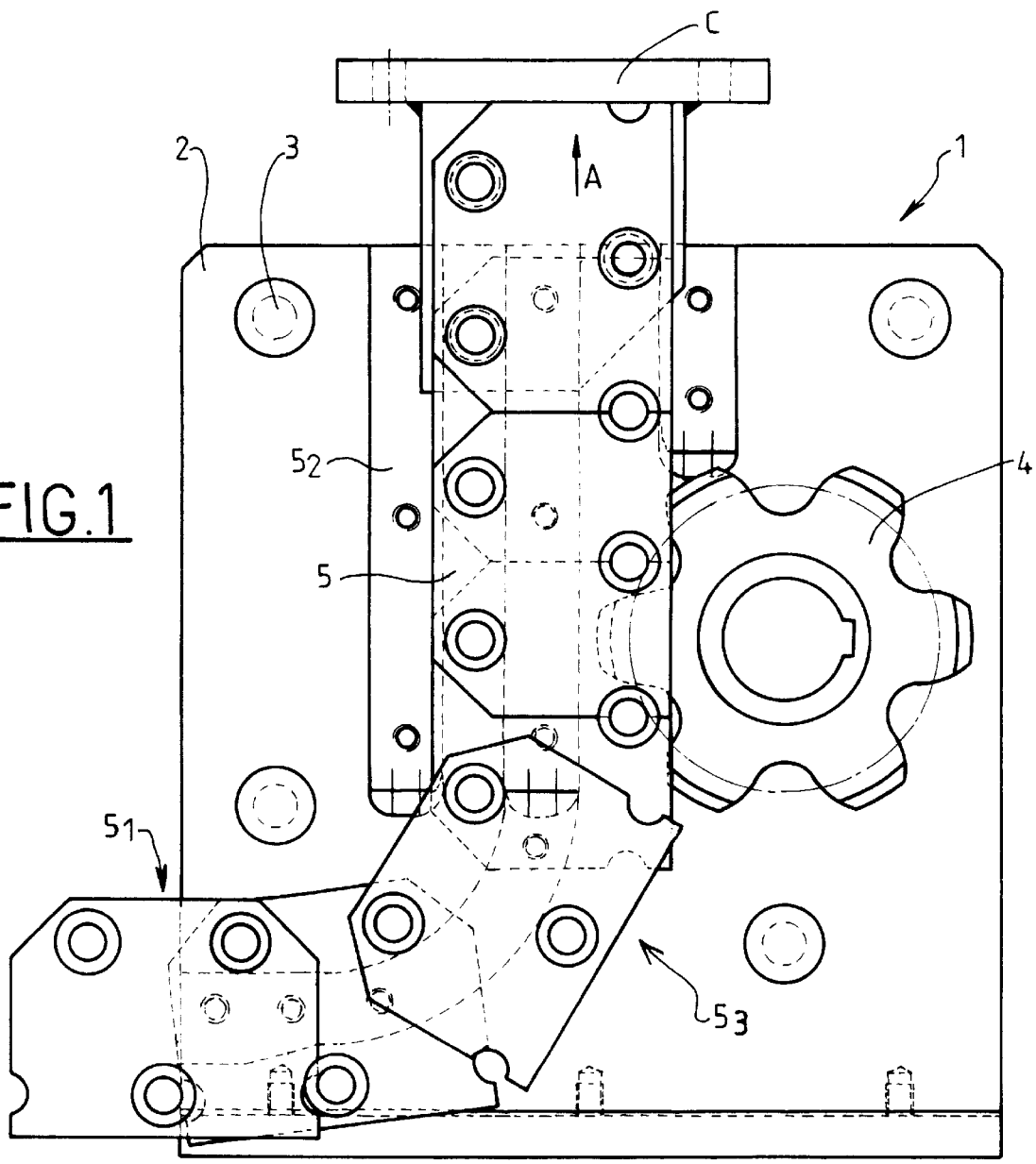
FIG. 1 is a schematic view of the load-lifting device, the top flange of the housing having been removed.

The purpose of the lifting device illustrated in FIG. 1 is to transmit vertical thrust forces in the direction of the arrow A in order to lift loads C across long distances.

This device essentially comprises, on the one hand a housing 1 having two flanges 2 linked by bolts 3, only one of which is illustrated in FIG. 1, and enclosing two rotary pinions 4 and, on the other hand, an articulated lifting column 5 driven backwards and forwards by the rotary pinions 4 and having a horizontal arm 51 and a vertical arm 52 separated by an elbow part 53.

Figures 2, 3:
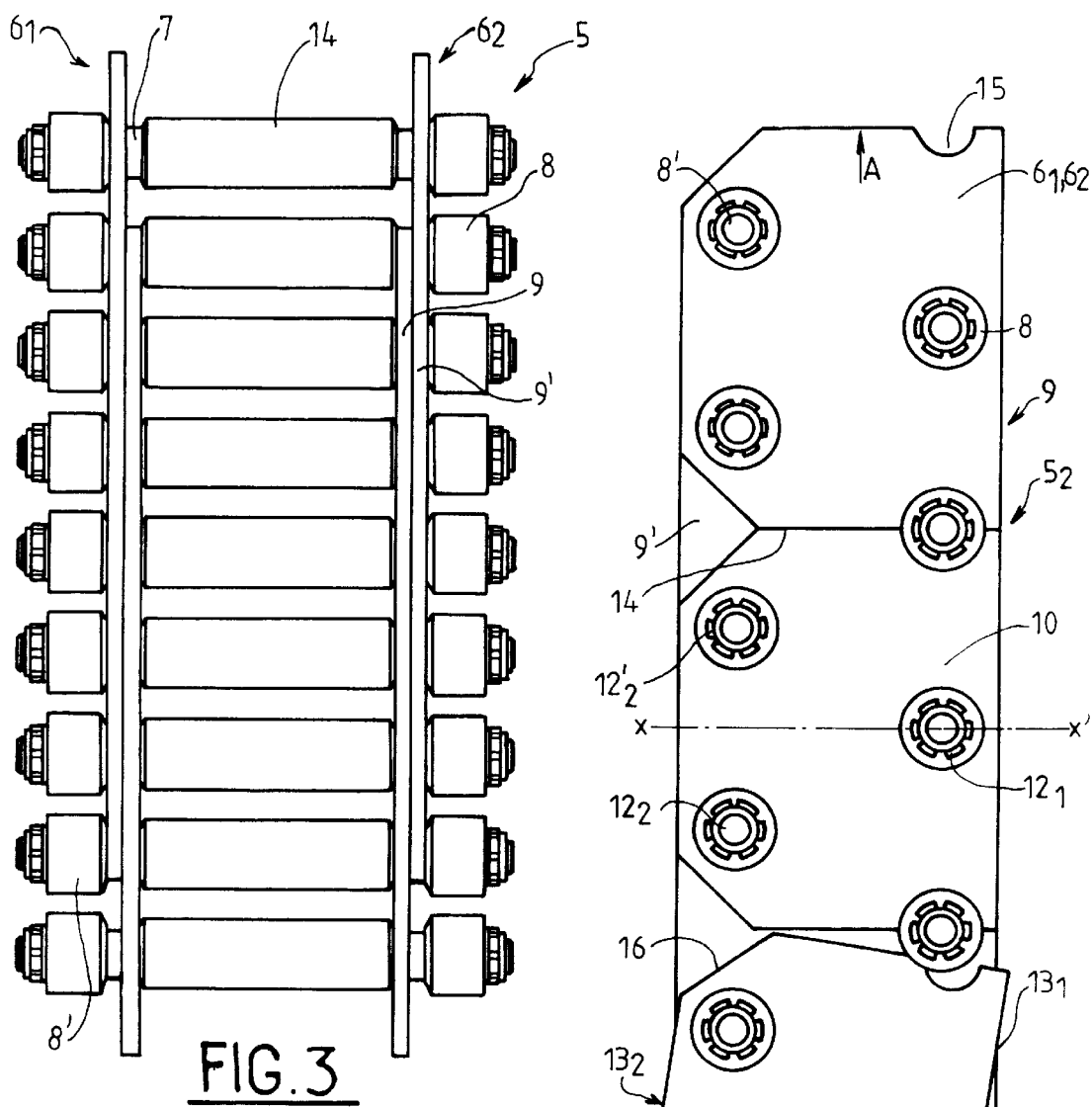
FIG. 2 is a schematic front view of one of the sides of the lifting column.
FIG. 3 is a side view of this column.

As illustrated in FIGS. 1 to 3, the lifting column 5 is made up of two parallel articulated sides 61, 62, joined by means of transversely oriented connecting shafts 7 and provided at their external ends with driving rollers 8 which co-operate with the driving pinions 4 or guide rollers 8' which co-operate with guide rails provided on the flanges 2 of the housing 1, which are not illustrated in the drawings. The driving rollers 8 and the guide rollers 8' are mounted loosely on the connecting shafts 7.

More specifically, and as may be seen from FIGS. 2 and 3, each of the sides 61, 62, consists of two contiguous rows 9, 9' of essentially rectangular plates 10, all of which are identical.

The plates 10 of a same row 9, 9' are placed end to end whilst the contiguous plates 10 of a row 9 in the contiguous row 9' are longitudinally offset at a pitch p equal to half of their length l.

As may be seen more clearly from FIG. 2, in which only one of the plates 10 of the inner row 9 has been illustrated by broken lines for the sake of clarity, the plates 10 all have holes on their main faces 11 by means of which they are applied one on top of the other in a row 9, 9' against another of three holes 12, for receiving the connecting shafts 7, arranged in the layout of an isosceles triangle.

Each of the plates 10 also has four edge faces which are subdivided on the one hand into two longitudinal edge faces 131, 132, of which 131 is internal whilst 132 is external relative to the elbow part 53 of the lifting column 5 and, on the other hand, two side edge faces 14.

The side edge faces 14 correspond to front and rear active faces which bear respectively against the rear and front active faces of adjacent plates of a same row 9, 9' on the vertical arm 52 of the lifting column 5.

Furthermore, and as illustrated in FIG. 2, the holes 12 receiving the connecting shafts 7 are subdivided on the one hand into a driving hole 121 contiguous with the external longitudinal edge face 131 and centred on the transverse axis x, x' of the plate 10 and, on the other hand, two articulation holes 122, 12'2 arranged symmetrically on either side of this axis x, x' and contiguous with the internal longitudinal edge face 132.

As may be seen from FIG. 2, the articulation holes 122, 12'2 of the plates 10 of two contiguous rows 9, 9' of a same side 61, 62 of the lifting column 5 are arranged in pairs one above the other.

Furthermore, and as may be seen from FIG. 2, the connecting shafts 7 of the two sides 61, 62 of the lifting column 5 are subdivided on the one hand into driving shafts 71 bearing driving rollers 8 and, on the other, articulation shafts 72 bearing guide rollers 8'.

The driving shafts 71 are inserted alternately through the driving holes 121 of the plates 10 of one or the other of the two contiguous rows 9, 9' of the sides 61, 62 whilst the articulation shafts 72 are inserted through the articulation holes 122, 12'2 arranged in pairs one above the other of the plates 10 of the two respective contiguous rows 9, 9'.

As illustrated in FIG. 3, the driving shafts 71 and the articulation shafts 72 are fitted, at their internal part located between the plates 10 of the two sides 61, 62, with return rollers 14 loosely mounted so as to enable the lifting column to fold on a level with the elbow part 53, whilst guide and driving rollers 8, 8' are also mounted loosely to the exterior of these plates 10.

As illustrated in FIG. 1, the pinions 4 are fixed in the housing 1 at the lower part of the vertical arm 52 of the lifting column 5 and on the external face thereof.

Figure 4:
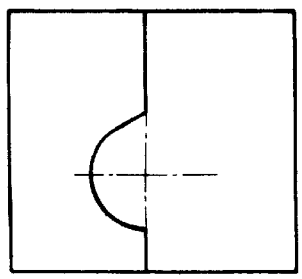
FIG. 4 is a detailed view of the notches.

Furthermore, as illustrated in FIG. 2, the side edge faces 14 of the plates 10 are provided with essentially semi-circular notches forming releasable enclosures 15 for receiving the driving shafts 72 on a level with the horizontal 51 and vertical 52 arms of the lifting column 5 where these faces 14 come to bear one against the other. These notches 15 are illustrated in more detail in FIG. 4.

The inner longitudinal edge faces 132 of the plates 10 are also provided with bevelled ends 16 enabling the lifting column 5 to be articulated on a level with its elbow part 53.

What is claimed is:

1. A lifting device designed to transmit vertical thrust forces, enabling load to be lifted over long distances, said device comprising:
   a housing fitted with a rotary pinion for driving an articulated lifting column; and
   a lifting column having a horizontal arm and a vertical arm separated by an elbow part, said lifting column including two parallel articulated sides joined by means of transversely oriented connecting shafts cooperating with said driving pinion,
   each said side comprising two contiguous rows of essentially rectangular plates placed end to end in a same row and longitudinally offset one row from another, each plate having on the one hand, two main faces having holes for receiving said connecting shafts, and by means of one of which the plates of one row are applied against the plates on the contiguous row, and, on the other hand, four edge faces, namely two longitudinal edge faces, one internal, the other external relative to the elbow part of the lifting column and two side edge faces defining a front active face and a rear active face which move to bear respectively against the rear and front active faces of the adjacent plates of a same row when the section of lifting column comprising the plates is vertically extended.

2. A lifting device as claimed in claim 1, in which the plates are offset at a pitch equal to half their length from one row to the contiguous row.

3. A lifting device as claimed in claim 1, in which the plates are all identical.

4. A lifting device as claimed in claim 1, in which each plate has three holes for receiving three connecting shafts arranged respectively in the layout of an isosceles triangle, namely one driving hole contiguous with the external longitudinal edge face centered on the transverse axis of the plate and two articulation holes arranged symmetrically on either side of this axis and contiguous with the internal longitudinal edge face, the articulation holes of the plates of the two contiguous rows of the same side of the lifting column being arranged in pairs one above the other.

5. A lifting device as claimed in claim 4, in which the connecting shafts of the two sides of te lifting column are subdivided on the one hand into articulation shafts inserted through the articulation holes arranged in pairs one above the other in the plates of the two respective contiguous rows and, on the other hand, driving shafts inserted alternately through the driving holes of the plates of one or the other of the two contiguous rows.

6. A lifting device as claimed in claim 5, in which the side edge faces of the plates are provided with essentially semi-circular notches forming a releasable enclosure enabling the driving shafts to be inserted therein when these faces move to bear one against the other.

7. A lifting device as claimed in claim 6, in which the internal longitudinal edge faces of the plates are beveled at their ends to allow the lifting column to be articulated on a level with its elbow part.

8. A lifting device as claimed in claim 1, in which the driving pinions are fixed to the bottom part of the vertical arm of the lifting column, on the external face thereof, and cooperate with the driving shafts of the plates.

* * * * *